United States Patent [19]

Katznelson

[11] Patent Number: 5,010,571
[45] Date of Patent: Apr. 23, 1991

[54] METERING RETRIEVAL OF ENCRYPTED DATA STORED IN CUSTOMER DATA RETRIEVAL TERMINAL

[75] Inventor: Ron D. Katznelson, San Diego, Calif.

[73] Assignees: Titan Linkabit Corporation; Cable/Home Communication Corporation, both of San Diego, Calif.

[21] Appl. No.: 905,775

[22] Filed: Sep. 10, 1986

[51] Int. Cl.⁵ .............................................. H04L 9/00
[52] U.S. Cl. ......................................... 380/4; 380/25; 380/29
[58] Field of Search ................................... 380/23–25, 380/28, 16, 20, 3, 4, 5; 358/84–46; 364/200, 900

[56] References Cited

U.S. PATENT DOCUMENTS

| | | | |
|---|---|---|---|
| 3,573,747 | 4/1971 | Adams et al. | 364/200 X |
| 3,956,615 | 5/1976 | Anderson et al. | 380/24 |
| 4,048,619 | 9/1977 | Forman, Jr. et al. | 380/34 X |
| 4,196,310 | 4/1980 | Forman et al. | 380/46 |
| 4,262,329 | 4/1981 | Bright et al. | 380/25 X |
| 4,323,921 | 4/1982 | Guillou | 380/20 |
| 4,337,483 | 6/1982 | Guillou | 380/20 |
| 4,433,207 | 2/1984 | Best | 380/4 |
| 4,484,217 | 11/1984 | Block et al. | 358/84 |
| 4,677,434 | 6/1987 | Fascenda | 380/23 |
| 4,712,238 | 12/1987 | Gilhousen et al. | 380/20 |
| 4,827,508 | 5/1989 | Shear | 380/4 |

FOREIGN PATENT DOCUMENTS

| | | |
|---|---|---|
| 0135422 | 3/1985 | European Pat. Off. |
| 2136175 | 9/1984 | United Kingdom |
| 0002310 | 5/1985 | World Int. Prop. O. |

OTHER PUBLICATIONS

"The New Alexandria", Alexandria Institute, vol. I, No. 1, Jul.-Aug. 1986.
Denning and Denning, "Data Security", Computing Surveys, vol. 11, No. 3, Sep. 1979.

*Primary Examiner*—Stephen C. Buczinski
*Assistant Examiner*—Bernarr Earl Gregory
*Attorney, Agent, or Firm*—Edward W. Callan

[57] ABSTRACT

A system for controlling and accounting for retrieval of data from a CD-ROM memory containing encrypted data files from which retrieval must be authorized. The system includes an authorization and key distribution terminal and a plurality of customer data retrieval terminals having such memories loaded therein. The authorization terminal authorizes retrieval of data by authorized customer terminals by providing to the authorized customer terminals an encryption key for enabling retrieval of the data and a authenticated credit signal for use in limiting the amount of data to be retrieved from the files. The encryption key is encrypted for communication to the customer terminals in unique unit keys that are stored in the respective customer terminals. The customer terminal limits the amount of data retrieved from the files in accordance with the credit signal; records the amount of data retrieved from the files; and provides to the authorization termimal an authenticated report of the recorded amount of data retrieved from said files. The memory includes data files of different data vendors; and the customer terminal separately records the retrieval of data from the files of the different vendors.

43 Claims, 5 Drawing Sheets

METERING RETRIEVAL OF ENCRYPTED DATA STORED IN CUSTOMER DATA RETRIEVAL TERMINAL

BACKGROUND OF THE INVENTION

The present invention generally pertains to data retrieval and is particularly directed to limiting and accounting for the retrieval of data from encrypted data files.

SUMMARY OF THE INVENTION

The present invention is a method and system for controlling and accounting for retrieval of data from a memory containing an encrypted data file from which retrieval must be authorized. The system includes means for authorizing such retrieval by providing an encryption key for enabling retrieval of the data and a credit signal for use in limiting the amount of data to be retrieved from the file; means for limiting the amount of data retrieved from the file in accordance with the credit signal; and means for recording the amount of data retrieved from the file. The sytem may further include means for reporting the recorded amount of data retrieved from the file; and means for authenticating such report.

The present invention is particularly suited for retrieving data files stored in a compact disc read-only-memory (CD-ROM).

Additional features of the invention are discussed in relation to the description of the preferred embodiment.

DESCRIPTION OF THE PREFERRED EMBODIMENTS

Figure 1:
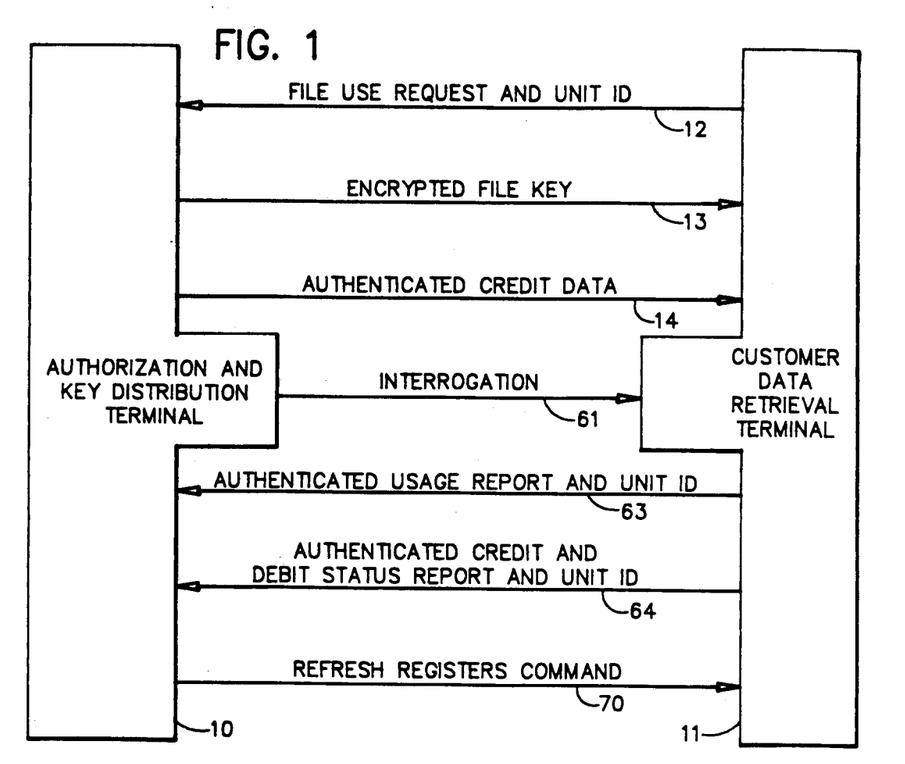
FIG. 1 is a block diagram illustrating the signals communicated between an authorization and key distribution terminal and a customer data retrieval terminal in a preferred embodiment of the present invention.

The use of a preferred embodiment of the system of the present invention is generally described with reference to FIG. 1. The system essentially includes an authorization and key distribution terminal 10 and a customer data retrieval terminal 11; it being understood that in practice there are a plurality of customer data retrieval terminals 11 that communicate with a single authorization and key distribution terminal 10. A memory containing an encrypted data file from which retrieval must be authorized is loaded in the customer data retrieval terminal 11. Different data files in the memory may be associated with different data vendors. Typically, communications between the authorization and key distribution terminal 10 and the customer data retrieval terminal 11 are transmitted over telephone lines.

In order to gain authorization to retrieve encrypted data from a given file stored in the memory loaded in the customer data retrieval terminal 11, the customer causes a file use request signal 12 to be communicated to the authorization and key distribution terminal 10. The file use request signal identifies the file for which retrieval authorization is requested and also contains an ID number identifying the customer terminal 11 from which the request signal 12 is sent.

The authorization and key distribution terminal 10 processes the request signal to determine whether the customer terminal 11 identified by the ID number contained in the file use request signal 12 is authorized to retrieve data from the file identified in the file use request signal 12. Such determination includes checking on the status of a customer account associated with the customer terminal 11 from which the request signal 12 is received; and may further include determining the eligibility of the customer to retrieve data from such file notwithstanding the outcome of the credit check.

Upon determining that the status of the customer account associated with the customer terminal 11 warrants authorizing retrieval of data from the file identified in the file use request signal 12, the authorization terminal 10 authorizes the customer terminal 11 to retrieve data from said file by providing to the customer terminal 11 both and encrypted file key 13 and an authenticated credit data signal 14. The credit data signal 14 indicates an amount of credit to be extended to the customer terminal 11 for retrieval of data from the file identified in the file use request signal 12.

The file key 13 is encrypted in a unit key that is unique to the customer terminal 11 to which the encrypted file key 13 and the authenticated credit signal 14 are being communicated. Unit keys for each of the customer terminals 11 associated with a given authorization and key distribution terminal 10 are stored in the authorization and key distribution terminal 10 and are individually retrieved in accordance with the customer terminal ID number that is included in the file use request signal 12. Each customer data retrieval terminal also permanently stores it own unique unit key. The authenticated credit data signal 14 is generated by including both unencrypted credit data and encrypted credit data that is formed by encrypting the unencrypted credit data with the unit key of the customer terminal that is being authorized.

Figure 2:
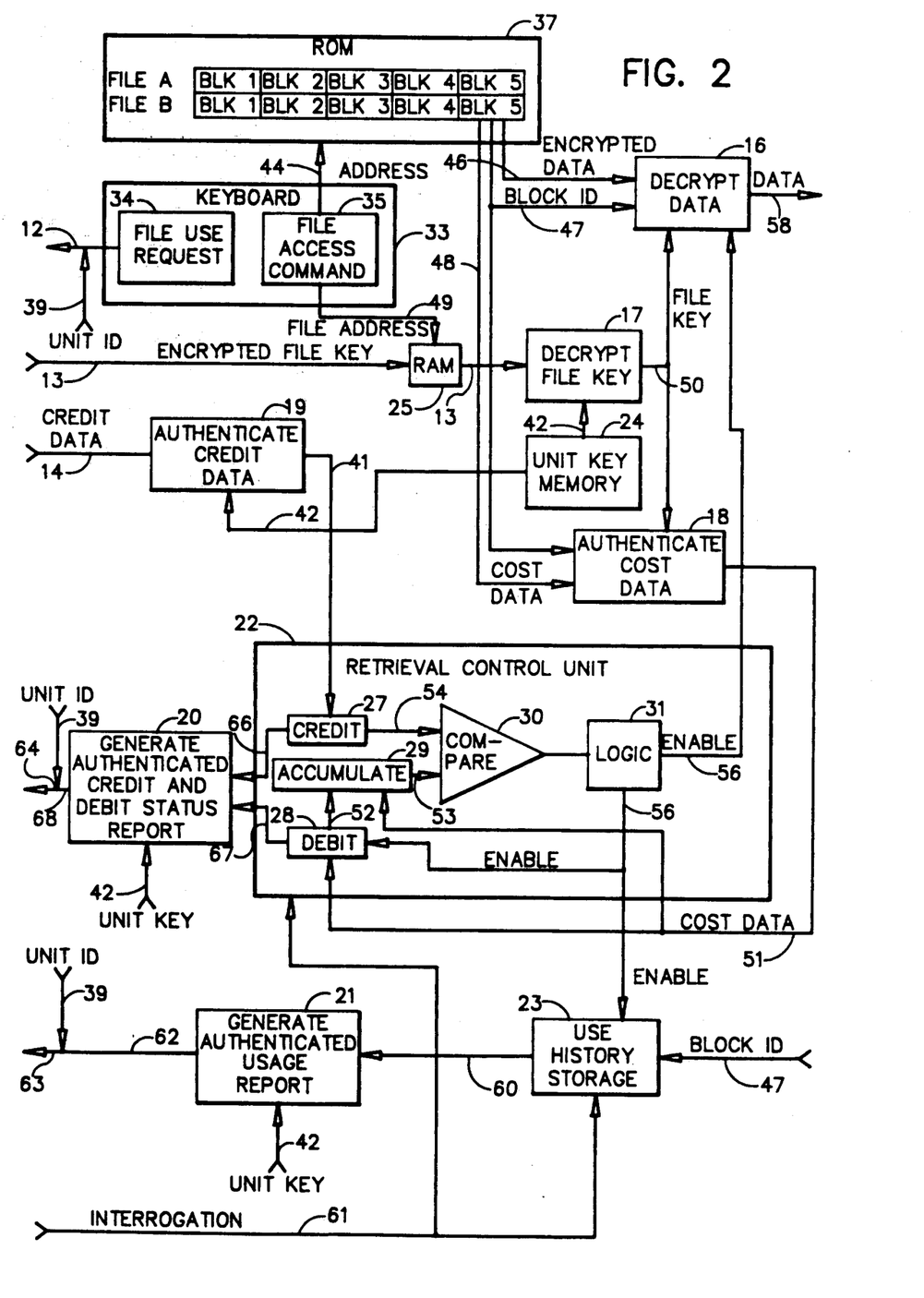
FIG. 2 is a functional block diagram of the customer data retrieval terminal in the embodiment of FIG. 1.

The operation of the customer data retrieval terminal 11 in retrieving the encrypted data from the memory loaded therein is described with reference to FIG. 2. Certain functional units of the customer data retrieval terminal 11 are implemented in a microcomputer. These functional units include a data decryption unit 16, a file key decryption unit 17, a cost data authentication unit 18, a credit data authentication unit 19, an authenticated credit and debit status report generation unit 20, an authenticated usage report generation unit 21, a retrieval control unit 22 associated with each data vendor, a use history storage unit 23 associated with each data vendor, a unit key memory 24 and a random access memory (RAM) 25. The retrieval control unit 22 includes a credit register 27, a debit register 28, an accumulator 29, a comparator 30 and a logic unit 31. The customer data retrieval terminal 11 further includes a keyboard 33 for generating a file use request 34 and a file access command 35.

A read only memory (ROM) 37 containing the encrypted data files is loaded in the customer data retrieval terminal 11. The ROM 37 includes a plurality of encrypted data files, File A, File B. Each data file includes encryted data blocks, Block 1, Block 2, ... Block 5. Each data file includes blocks of data of a given type of association. The different data files may be associated with different data vendors and there may be a plurality of data files associated with each of the different vendors. Each block of data includes encrypted data, a block ID (identification) signal, and authenticated cost data. The authenticated cost data indicates the cost associated with retrieving the given encrypted block of data.

To enable the customer data retrieval terminal 11 to retrieve data from any given file in the ROM 37, the file use request 34 identifying a given file is generated by use of the keyboard 33 and combined with the unit ID number 39 for the customer terminal 11 to provide the file use request signal 12 that is communicated to the authorization and key distribution terminal 10. As discussed above, the authorization and key distribution terminal 10 responds to the file use request signal 12 by providing the encrypted file key 13 and the authenticated credit data signal 14 to the customer terminal 11 when the authorization and key distribution terminal determines that the customer terminal 11 is authorized to retrieve the data identified in the file use request signal 12.

The encrypted file key 13 is stored in the RAM 25.

The received credit data signal 14 containing the credit data in both encrypted and unencrypted form is authenticated by the credit data authentication unit 19, which is keyed by the unit key 42 stored in the unit key memory 24 to decrypt the encrypted credit data and thereby provide a decrypted credit data signal, which is compared with the unencrypted credit data signal in the authenticated credit data signal 14 to authenticate the received credit data signal 14. An authenticated credit data signal 41 is stored in the credit register 27 of the retrieval control unit 22 associated with the same vendor as the file from which data retrieval is being authorized. If the credit register 27 already has a credit balance, such balance is incremented by the amount indicated by the authenticated credit signal 41.

A message (not shown) indicating that authorization has been granted for the customer terminal 11 to retrieve data from the requested file is also communicated by the authorization and key distribution center 10 to the customer terminal 11 and displayed on a monitor (not shown) at the customer terminal 11.

To retrieve a given block of data from an authorized data file in the ROM 37, the keyboard 33 is operated to provide a file access command 35 which includes an address signal 44 directed to the ROM 37 for accessing the given block of data. In the example shown in FIG. 1, the accessed block of data is block 5 of file B. Upon the block of data being accessed, the encrypted data 46, the block ID signal 47 and authenticated cost data 48 are read therefrom. The authenticated cost data includes both unencrypted cost data and encrypted cost data formed by encrypting the unencrypted cost data with the applicable file key for the file containing the block of data that is being retrieved.

The applicable encrypted file key 13 is retrieved from the RAM 25 in response to a file address 49 included in the file access command 35 and decrypted by the file key decryption unit 17, which is keyed by the unit key 42 stored in the unit key memory 24. The file key decryption unit 17 provides a decrypted file key 50 to the data decryption unit 16 and the cost data authentication unit 18.

The retrieved cost data signal 48 containing cost data in both encrypted and unencrypted form is authenticated by the cost data authentication unit 18, which is keyed by the file key 50 and initialized by the block ID signal 47 (used as an initialization vector) to decrypt the encrypted cost data and thereby provide a decrypted cost data signal, which is compared with the unencrypted cost data signal in the retrieved cost data signal 48 to authenticate the cost data signal.

An authenticated cost data signal 51 is provided to the debit register 28 and the accumulator 29. The debit register 28 is not immediately incremented by the cost data signal 51, however. First the accumulator 29 adds the cost data signal 51 to a debit signal 52. The debit signal 52 indicates the sum of previous data retrieval costs accumulated in the debit register 28. The sum 53 of the cost data and the previously accumulated data retrieval costs indicated in the accumulator 29 is then compared by the comparator 30 with an accumulated credit signal 54 from the credit register 27 to determine whether the customer terminal 11 has been credited with sufficient credilt to authorize retrieval of data from the requested file. When the compensation indicates that there is sufficient accumulated credit to authorize such retrieval, the logic unit 31 provides an enable signal 56 to the data decryption unit 16, the debit register 28 and the use history storage unit 23. The enable signal 56 enables the cost data 51 to be incremented into the debit register 28. As noted above, the customer terminal 11 includes a plurality of retrieval control units 22 corresponding to a plurality of different vendors for accounting for the retrieval of data from the files associated with each of the different vendors.

The enable signal 56 also enables the operation of the data decryption unit 16. The data decryption unit 16 is keyed by the unit key 42 stored in the unit key memory 24 for decrypting the encrypted data 46 and providing retrieved data 58. The block ID signal 47 is used as an initialization vector by the data decryption unit 16 in combination with the decrypted file key 50 for decrypting the decrypted data 46.

Upon being enabled by the enable signal 56, the use history storage unit 23 stores the block ID signal 47 to record the identity of the block of data retrieved from the ROM 37. The block ID signal identifies the file from which the data was retrieved and includes an address identifying the vendor associated with the retrievede file for addressing the use history storage unit 23 associated with the vendor of the data in the retrieved file. As noted above, the customer terminal 11 includes a plurality of use history storage units 23 corresponding to a plurality of different vendors for separately recording the amount of data retrieved from the files associated with each of the different vendors.

A usage report 60 indicating the usage history recorded in the use history storage unit 23 is generated for communication to the authorization and key distribution terminal 10 in response to either operation of the keyboard 33 or an interrogation signal 61 received from the authorization and key distribution terminal 10.

The block ID number further identifies the retrieved data by type; whereupon the type of data retrieved is recorded in the history storage unit 23 and included in the usage report 60.

An authenticated usage report 62 is generated by the authenticated usage report generation unit 21, which is keyed by the unit key 42 stored in the unit key memory 24, to encrypt the usage report. The authenticated usage report generation unit 21 provides the authenticated usage report 62, which includes the usage report in both encrypted and unencrypted form and is combined with the unit ID number 39 for communication to the authorization and key distribution terminal 10 as an authenticated usage report and unit ID signal 63.

Together with the authenticated usage report and unit ID signal 63, there also is communicated to the authorization and key distribution terminal 10 an authenticated credit and debit status report and unit ID signal 64. This signal 64 is provided in response to either operation of the keyboard 33 or the interrogation signal 61 being directed to the retrieval control unit 22. Signals 66 and 67 respectively indicating the status of the credit and debit registers 27 and 28 are encrypted by the authenticated credit and debit status report generation unit 20, which is keyed by the unit key 42 stored in the unit key memory 24. The authenticated credit and debit status report generator 20 provides an authenticated credit and debit status report signal 68, which includes such status report in both encrypted and unencrypted form, and which is combined with the unit ID number 39 to provide the authenticated credit and debit status report and unit ID signal 64.

The credit register 27, the debit register 28 and the use history storage unit 23 for any given vendor can be reset to zero when desired in response to a refresh registers command 70 (FIG. 1) communicated from the authorization and key distribution terminal 10. Such command 70 would be communicated, for example, when a given customer terminal account associated with a given vendor is closed out.

Figure 3:
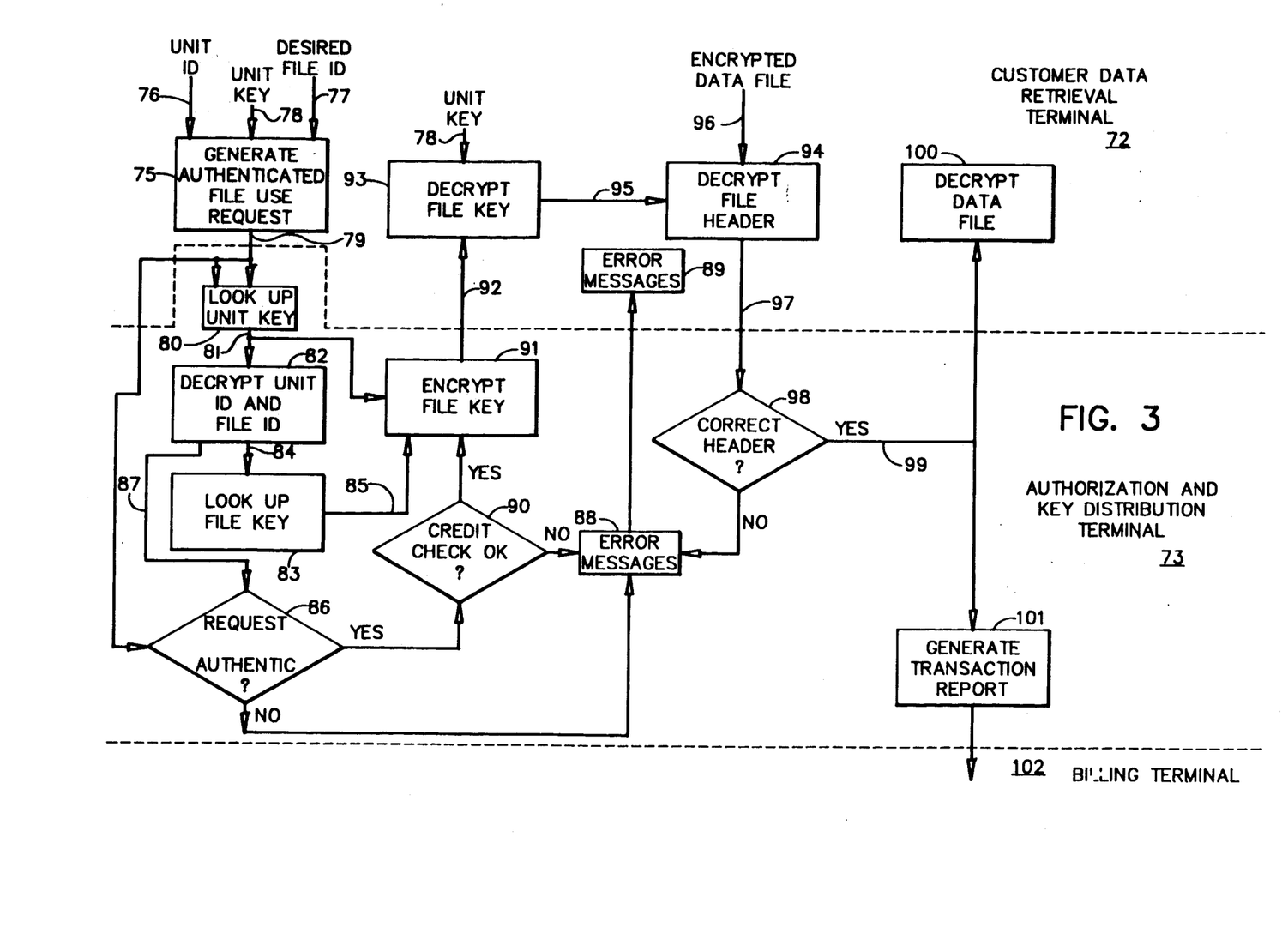
FIG. 3 is a flow diagram showing operational routines in an alternative preferred embodiment of the present invention.

In an alternative preferred embodiment, as shown in FIG. 3, a separate file use request is communicated from a customer data retrieval terminal 72 to an authorization and key distribution terminal 73 for each data file that is be retrieved. The operational routines illustrated in FIG. 3 are implemented by a microcomputer.

Initially, a routine 75 is performed in the customer terminal 72 for generating an authenticated file use request containing a unit ID number 76 for the customer terminal 72 and the file number 77 for the desired file. The generated file use request is encrypted in the unit encryption key 78 that is unique to the customer terminal 72 and communicated to the authorization and key distribution terminal 73 in an authenticated file use request message 79 that also includes the unencrypted unit ID nummber 76.

Upon receipt of the message 79, the authorization and key distribution terminal 73 performs a look-up routine 80 for looking up the unit key for the customer terminal 72 identified by the received unencrypted unit ID number.

Using the looked-up unit key 81, the authorization and key distribution terminal 73 performs a decryption routine 82 for decrypting the unit ID number and the desired file ID number from the received message 79.

The terminal 73 then performs another look-up routine 83, wherein the decrypted file ID number 84 is used to look up the file key 85 that was used for encrypting the file identified by the decrypted file number 84.

The terminal 73 also performs an authentication routine 86 for determining whether the received message 79 is authentic, wherein the decrypted unit ID number 87 is compared with the unit ID number contained in the received message 79. If it is determined from such comparison 86 that the message 79 is not authentic, the terminal 73 generates an error message 88 indicating that the received message 89 is not authentic. The error message is then communicated to and displayed 89 at the customer terminal 72.

If it is determined from the comparison 86 that the message 79 is authentic, the terminal 73 performs a credit check routine 90 for the customer terminal 72 identified by the unit ID number. If it is determined from such credit check 90, that credit should not be extended for retrieval of data from the requested file by the identified customer terminal 72, the authorization and key distribution terminal 73 generates an error message 88 indicating that credit is not authorized and communicates the error message to the customer terminal for display 89 at the customer terminal 72.

If it is determined from the credit check 90 that credit should be extended for retrieval of data from the requested file by the identified customer terminal 72, the file key 85 is encrypted in the unit key 81 for the identified customer terminal 72 by an encryption routine 91 and the encrypted file key 92 is communicated to the customer terminal 72.

The customer terminal 72 than performs a decryption routine 93, wherein the unit key 78 stored therein is used to decrypt the encrypted file key 92.

Next, the customer terminal performs a decryption routine 94, wherein the decrypted file key 95 is used to decrypt the file header for the encrypted data file 96 identified by the desired file number 77. The decrypted file header 97 is communicated to the authorization and key distribution terminal 73, which in turn performs a comparison routine 98 to determine whether the decrypted header is the correct header for the file identified by the decrypted file number 84. This routine 98 verifies the decryption of the encrypted file key 92 communicated to the customer terminal 72 prior to debiting the account maintained for the customer terminal 72. If it is determined that the correct header has not been decrypted, the terminal 73 performs an error message routine 88, wherein an error message indicating the error is generated and communicated to the customer terminal 72 for display 89.

If it is determined that the correct header has been decrypted, an enable signal is communicated to the customer terminal 72 to enable a data file decryption routine 100. The enable signal 99 also initiates a routine 101 in the j authorization and key distribution terminal 73, wherein a transaction report identifying the customer terminal 72 and the data file is generated and communicated to a billing terminal 102 for billing the customer associated with the customer terminal 72 for the retrievalof data from the requested file.

Figure 4:
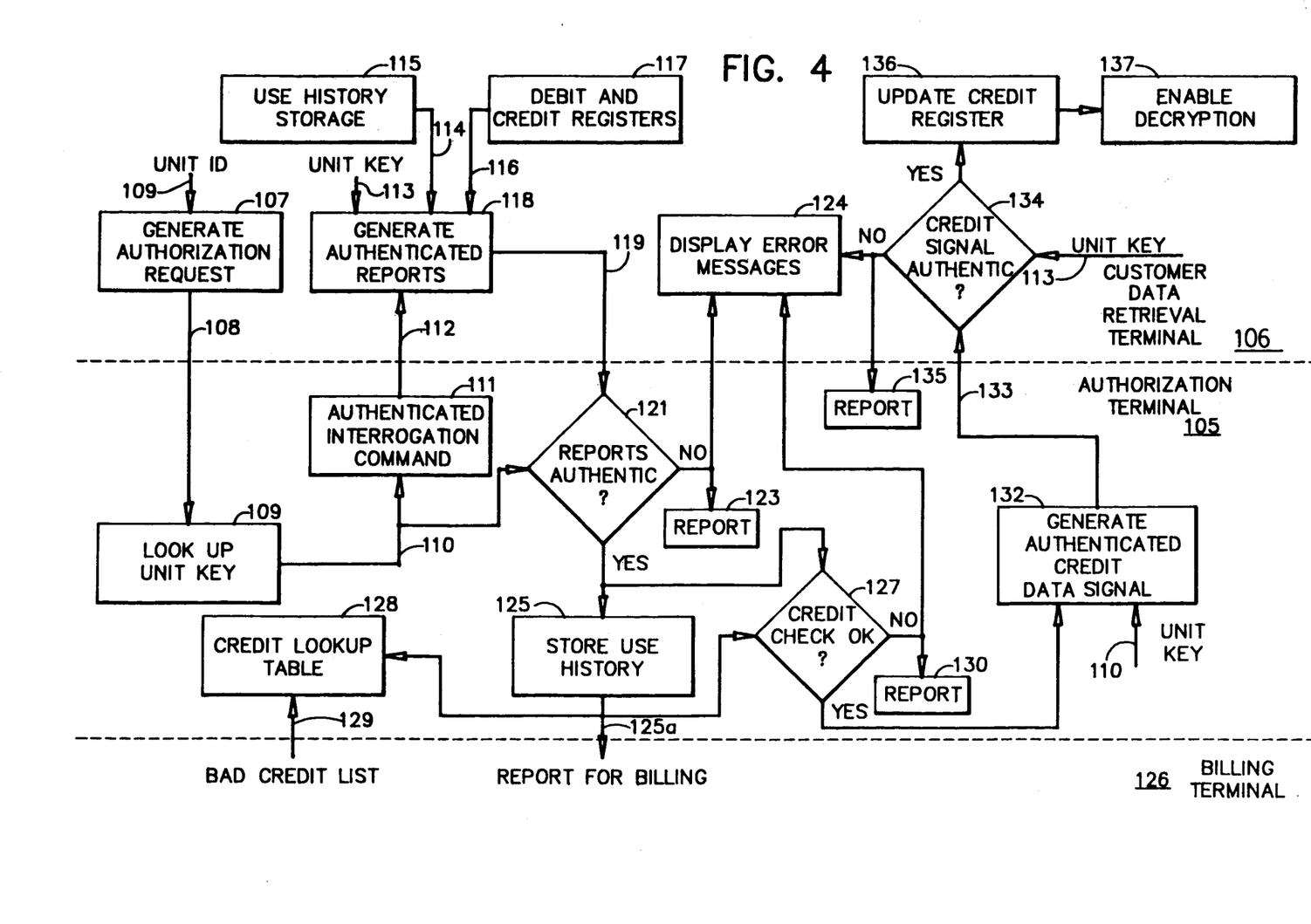
FIG. 4 is a flow diagram showing operational routines in another alternative preferred embodiment of the present invention.

In an alternative preferred embodiment shown in FIG. 4, an authorization terminal 105 and a customer terminal 106 perform several authentication and reporting routines. The operational routines illustrated in FIG. 4 are implemented by a microcomputer.

Initially, the customer terminal 106 performs a routine 107 wherein an authorization request 108 containing the customer terminal unit ID number 109 is generated and communicated to the authorization terminal 105. The authorization terminal 105 performs a look-up routine 109 for looking up the unit key 110 for the customer terminal 106 identified by the unit ID number contained in the request 108.

The authorization terminal then performs an authenticated signal generation routine 111, wherein the unit key 110 is used to encrypt an interrogation command. The encrypted interrogation command 112 is combines with the unencrypted interrogation command to provide an authenticated interrogation command, which is communicated othe customer terminal 106, where it is authenticated by using the unit key 113 stored therein.

The routines for generating authenticated given data that are described herein include the steps of encrypting the given data and generating a signal that includes the given data in both encrypted and unencrypted form.

The routines for authenticating given data that are described herein include the steps of decrypting given data that has been encrypted and comparing the decrypted data to the given data in unencrypted form.

It is to be understood that other techniques of generating authenticated data and of authenticating given data may be used in other embodiments of the present invention.

The customer terminal 106 responds to the interrogation command 112 by retrieving a use history report 114 for the user terminal 106 from a use history storage unit 115 and a debit and credit report 116 for the customer terminal 106 from debit and credit registers 117. The customer terminal then performs an authentication routine 118, wherein the unit key 113 is used to encrypt the use history report 114 and the debit and credit report 116. An authenticated report 119 including the reports 114 and 116 in both encrypted and unencrypted form is communicated to the authorization terminal 105.

The authorizaiton terminal performs a routine 121 using the unit key 110 to authenticate the report 119. The use history and debit and credit reports also are processed in lation to each other in accordance with certain criteria to determine their authenticity. If it is determined that the rport 119 is not authentic, a report 123 is generated in the authorization terminal 105 and an error message is communicated to and displayed 124 in customer terminal 106.

If it is determined that the reports 119 is authentic, the use history is stored 125 for report 125a to a billing terminal 126 and the authorization terminal 105 performs a credit check routine 127 in view of the status of the accounts for the customer terminal 106, as updated by the authenticated report 119, to determine whether the customer terminal 106 should be authorized to retrieve data from encrypted data files loaded therein. In conducting such credit check, the credit check routine 127 also accesses a credit look-up table 128 that includes a bad credit list 129 recieved from the billing terminal 126.

If the credit check routine 127 determines that the customer terminal 106 should not be authorized to retrieve data from encrypted data files loaded therein, an error report 130 is generated in the authorization terminal 105 and an error message is communicated to and displayed 124 in the customer terminal 106.

If the credit check routine 127 determines that the customer terminal 106 should be authorized to retrieve data from encrypted data files loaded therein, the authorization terminal 105 performs a routine 132, wherein the unit key 110 is used to generate an authenticated credit data signal 133, which is communicated to the customer terminal 106. The credit data signal indicates a predetermined number of retrieval units in accordance with the credit rating assigned to the customer terminal 106.

The customer terminal performs an authentication routine 134 on the credit data signal 133 by using the unit key 113 stored in the customer terminal 106. If it is determined pursuant to the authentication rountine 134 that the credit data signal 133 is not authentic, an error message is displayed 124 in the customer terminal 106 and reported in the authorization terminal 105.

If the authentication routine 134 determines that the encrypted credit signal is authentic, the credit register in the customer terminal 106 is updated 136 and decryption of the data in the data file loaded in the customer terminal is enabled 137 in accordance with the amount of updated credit.

The opertion of providing an encrypted file key from the authorization center 105 to the customer terminal 106 is not necessarily included in combination with the operations described in relation to the embodiment of FIG. 4, although it may be if desired. Alternatively, a file key for each vendor may be permanently stored in the customer terminal 106 for use in decrypting data encrypted in the file key for the respective vendor, or a file key for each vendor may be contained in a card that is independently loaded into the customer terminal 106, and which may be changed from time to time or in accordance with the particular vendor from whose data file that data is to be retrieved.

Figure 5:
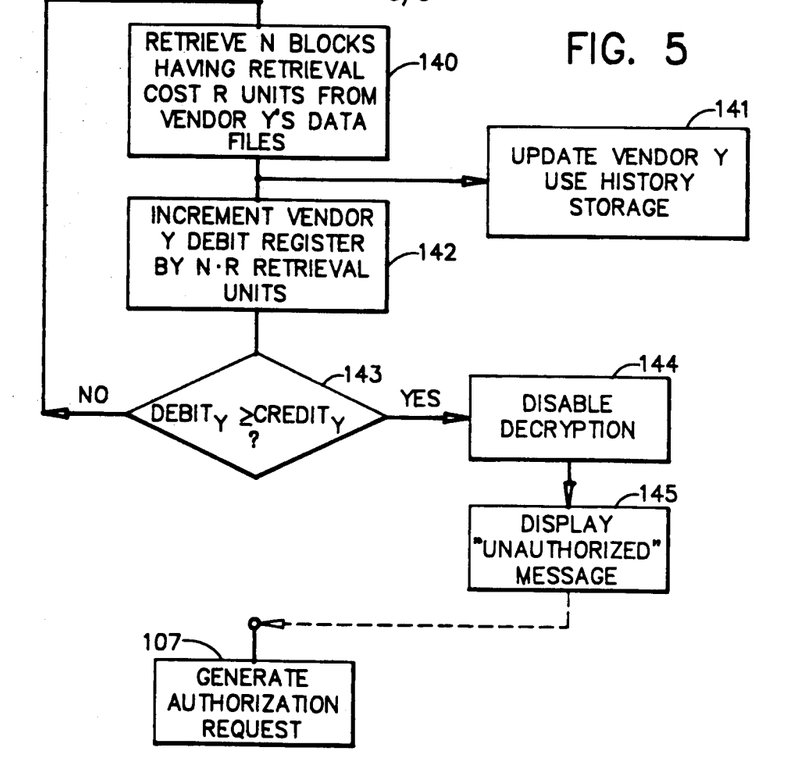
FIG. 5 is a flow diagram showing certain aspects of the operational routines in still another alternative preferred embodiment of the present invention.

FIG. 5 illustrates an exemplary series of operational routines that may be used with the embodiment of FIG. 4 for controlling the retrieval of data from different encrypted files associated with each vendor and for recording the retrieval of data from such files. The operations described with reference to FIG. 5 are performed by a microcomputer in the customer terminal. In this example, each data file includes a plurality of data blocks and data blocks of different types. Each different type of data block has its own unique cost data manifested in a specified amount of retrieval units R associated therewith.

Pursuant to a plurality of retrieval routines 140, a quantity of N blocks of a type having a retrieval cost R are retrieved from data files associated with vendor Y; whereupon the use history storage for vendor Y is updated 141 and the debit register for vendor Y is incremented by N times R retrieval units 142. A comparison routine 143 is performed each time the debit register is incremented to determine whether the amount in the debit register for vendor Y is equal to or exceeds the amount in the credit register for vendor Y. If not, further data retrieval from the data files associated with vendor Y may continue. When the amount in the debit register equals or exceeds the amount in the credit register, decryption is disabled 144 and a message that retrieval is "unauthorized" is displayed 145 at the customer terminal.

The customer then knows that he must cause the customer terminal to generate another authorization request 108, as in the embodiment of FIG. 4, in order to receive a further credit signal from the authorization terminal and thereby increment the credit register before further retrieval from the data files of vendor Y will be authorized.

Figure 6:
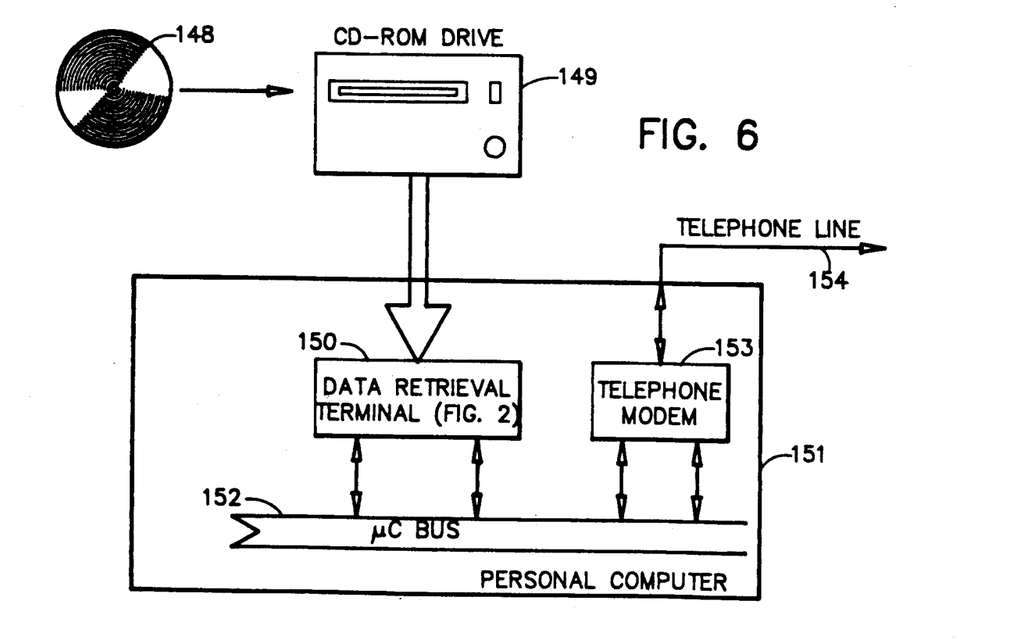
FIG. 6 is a block diagram illustrating the use of a customer data retrieval terminal in a personal computer for retrieving data from a CD-ROM.

In view of its storage capacity and ease of data retrieval, a CD-ROM is preferred as the storage medium for the data files to be retrieved in accordance with the present invention. Referring to FIG. 6, a CD-ROM 148 is loaded into a CD-ROM drive 149, which is connected to a customer data retrieval terminal 150, such as that described with reference to FIG. 2. The customer data retrieval terminal 150 is contained in a microcomputer in a personal computer 151 and uses the microcomputer bus 152 to communicate with an authorization and key distribution terminal (not shown) via a telephone modem 153 and the telephone line 154.

The Data Encryption Standard (DES) algorithm is preferred for the encryption and decryption steps described herein. The unit key memory in the customer data retrieval terminals is a secure memory included in an integrated circuit chip having an architecture that prevents the memory from being accessed from off the chip. The secure memory can be accessed only by the processor in the microcomputer that performs the DES algorithm.

Figure 7:
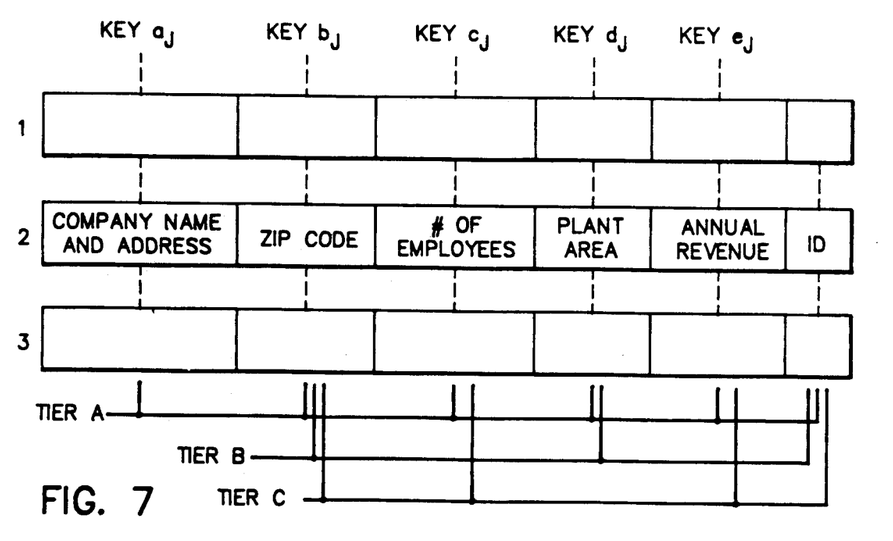
FIG. 7 illustrates an exemplary scheme of tiering the retrieval of different types of data fields from a memory in accordance with a preferred embodiment of the present invention.

The retrieval of different types of data from the memory loaded in the customer data retrieval terminal may be authorized in predetermined tiers corresponding to the different types of data, as shown in an example illustrated in FIG. 7. In this example data file J includes data blocks 1, 2, 3, each of which include a plurality of corresponding different data fields a, b, c, d, e. Each of the commonly designated data fields is related to a common type of data. In the example of FIG. 7, each data block a, b, c, d, e, pertains to a different company; field "a" contains the company name; field "b" contains the zip code; field "c" contains the number of employees; field "d" contains the plant area; and field "e" contains annual revenue. Each data block also also includes a block ID number.

In order to limit the retrieval authorization for different customer terminals to different types of data, the file key is subdivided into a plurality of field keys corresponding to the different data fields. Accordingly, the file key for data field J includes field keys $a_J$, $b_J$, $c_J$, $d_J$, $e_J$. Different authorizaiton tiers A, B C, are assigned to different customer terminals in accordance with the different combinations of the different types of data fields that they are authorized to retrieve. In the example of FIG. 7, tier A is assigned to customer terminals authorized to retrieve data from all of the data fields in the data file; tier B is assigned to customer terminals authorized to retrieve data from only fields b and d; and tier C is assigned to customer terminals authorized to retrieve data from only fields b, c, and e.

I claim:

1. A method of controlling and accounting for retrieval of data from a memory, comprising the steps of
   (a) providing a memory containing an encrypted data file from which retrieval must be authorized;
   (b) authorizing said retrieval by providing an encryption key for enabling retrieval of said data and a credit signal for use in limiting the amount of data to be retrieved from said file;
   (c) limiting the amount of data retrieved from said file in accordance with said credit signal;
   (d) recording the amount of data retrieved from said file;
   (e) reporting the recorded amount of data retrieved from said file; and
   (f) authenticating said report.

2. A method of controlling and accounting for retrieval of data from a memory, comprising the steps of
   (a) providing a memory containing an encrypted data file from which retrieval must be authorized;
   (b) authorizing said retrieval by providing an encryption key for enabling retrieval of said data and a credit signal for use in limiting the amount of data to be retrieved from said file;
   (c) limiting the amount of data retrieved from said file in accordance with said credit signal; and
   (d) recording the amount of data retrieved from said file;
   wherein step (b) comprises the step of
   (e) authenticating said credit signal.

3. A method of controlling and accounting for retrieval of data from a memory, comprising the steps of
   (a) providing a memory containing an encrypted data file from which retrieval must be authorized;
   (b) authorizing said retrieval by providing an encryption key for enabling retrieval of said data and a credit signal for use in limiting the amount of data to be retrieved from said file;
   (c) limiting the amount of data retrieved from said file in accordance with said credit signal;
   (d) recording the amount of data retrieved from said file; and
   (e) determining whether credit should be extended in response to a retrieval request prior to providing said encryption key, and, if so, the amount of said credit to be indicated by said credit signal.

4. A method of controlling and accounting for retrieval of data from a memory, comprising the steps of
   (a) providing a memory containing an encrypted data file from which retrieval must be authorized;
   (b) authorizing said retrieval by providing an encryption key for enabling retrieval of said data and a credit signal for use in limiting the amount of data to be retrieved from said file;
   (c) limiting the amount of data retrieved from said file in accordance with said credit signal; and
   (d) recording the amount of data retrieved from said file;
   wherein
   step (a) comprises providing a memory containing encrypted data files for each of a plurality of different data vendors, with a different said encryption key and credit signal being required to retrieve the data file and/or files associated with each of said vendors;
   step (b) comprises providing a separate set of encryption key and credit signal for each vendor associated with a said file retrieval authorization;
   step (c) comprises limiting retrieval of files associated with different vendors separately in accordance with the encryption key and credit signal provided for said vendor; and
   step (d) comprises separately recording the amount of retrieved data with respect to each vendor.

5. A method according to claim 4, wherein
   step (a) comprises providing a memory containing a plurality of encrypted data files for a given data vendor; and
   step (d) comprises separately recording the amount of retrieved data with respect to each data file of said given vendor.

6. A method of controlling and accounting for retrieval of data from a memory, comprising the steps of (a) providing a memory containing an encrypted data file from which retrieval must be authorized;

(b) authorizing said retrieval by providing an encryption key for enabling retrieval of said data and a credit signal for use in limiting the amount of data to be retrieved from said file;

(c) limiting the amount of data retrieved from said file in accordance with said credit signal; and (d) recording the amount of data retrieved from said file; wherein step (a) comprises providing a said memory that further contains unencrypted initialization vector data uniquely associated with different blocks of data within the encrypted data file; and the method further comprises the steps of (e) using said initialization vector data in combination with said encryption key to retrieve data from said file; and (f) using said unique initialization vector data upon said retrieval to record the identity of the block of data retrieved from said file.

7. A method of controlling and accounting for retrieval of data from a memory, comprising the steps of (a) providing a memory containing an encrypted data file from which retrieval must be authorized;

(b) authorizing said retrieval by providing an encryption key for enabling retrieval of said data and a credit signal for use in limiting the amount of data to be retrieved from said file;

(c) limiting the amount of data retrieved from said file in accordance with said credit signal; and (d) recording the amount of data retrieved from said file; wherein step (a) comprises providing a said memory that further contains cost data associated with different blocks of data that can be retrieved from said memory; and the method further comprises the steps of (e) processing the cost data with said credit signal in response to a request to retrieve a given block of data to determine whether retrieval of said requested block of data is authorized; and (f) authenticating said cost data prior to said processing of same.

8. A method of controlling and accounting for retrieval of data from a memory, comprising the steps of (a) providing a memory containing an encrypted data file from which retrieval must be authorized;

(b) authorizing said retrieval by providing an encryption key for enabling retrieval of said data and a credit signal for use in limiting the amount of data to be retrieved from said file;

(c) limiting the amount of data retrieved from said file in accordance with said credit signal; and (d) recording the amount of data retrieved from said file; wherein step (a) comprises providing said memory in a customer data retrieval terminal; and step (b) comprises determining in an authorization center located remotely from said customer terminal whether the status of an account associated with said customer terminal warrants authorizing said retrieval, and, if so, providing said encryption key and said credit signal in the customer data retrieval terminal.

9. A method according to claim 8, wherein step (a) comprises providing a said memory that further contains cost data associated with different blocks of data that can be retrieved from said memory; and the method further comprises the steps of (e) recording in said customer terminal, the cost data for the blocks of data retrieved in relation to said credit signal provided therein; and (f) reporting to the authorization center the record of said cost data in relation to said credit signal.

10. A method according to claim 9, further comprising the step of (g) authenticating said report of the record of said cost data in relation to said credit signal.

11. A method of controlling and accounting for retrieval of data from a memory, comprising the steps of (a) providing in the customer data retrieval terminal a memory containing an encrypted data file from which retrieval must be authorized;

(b) authorizing said retrieval in response to a request to retrieve data from said file in said customer data retrieval terminal by determining in an authorization center located remotely from the customer terminal whether the status of an account associated with said customer terminal warrants authorizing said retrieval, and, if so, providing to the customer terminal an encryption key for enabling retrieval of data from said file in the customer data retrieval terminal; and (c) recording the retrieval of data from said file by said customer retrieval terminal and debiting said account for said retrieval.

12. A method according to claim 11 wherein step (b) comprises the step of (d) encrypting said encryption key.

13. A method of controlling and accounting for retrieval of data from a memory, comprising the steps of (a) providing in the customer data retrieval terminal a memory containing an encrypted data file from which retrieval must be authorized;

(b) authorizing said retrieval in response to a request to retrieve data from said file in said customer data retrieval terminal by determining in an authorization center located remotely from the customer terminal whether the status of an account associated with said customer terminal warrants authorizing said retrieval, and, if so, providing to the customer terminal an encryption key for enabling retrieval of data from said file;

(c) recording the retrieval of data from said file by said customer retrieval terminal and debiting said account for said retrieval; and (d) verifying decryption of data from said requested file pursuant to use of said encryption key prior to debiting said account.

14. A system for controlling and accounting for retrieval of data from a memory containing an encrypted data file from which retrieval must be authorized, comprising means for authorizing said retrieval by providing an encryption key for enabling retrieval of said data and a credit signal for use in limiting the amount of data to be retrieved from said file;

means for limiting the amount of data retrieved from said file in accordance with said credit signal;

means for recording the amount of data retrieved from said file;

means for reporting the recorded amount of data retrieved from said file; and means for authenticating said report.

15. A system for controlling and accounting for retrieval of data from a memory containing an encrypted data file from which retrieval must be authorized, comrpising means for authorizing said retrieval by providing an encryption key for enabling retrieval of said data and a credit signal for use in limiting the amount of data to be retrieved from said file;

means for limiting the amount of data retrieved from said file in accordance with said credit signal; and means for recording the amount of data retrieved from said file;

wherein the authorization means comprises means for authenticating said credit signal.

16. A system for controlling and accounting for retrieval of data from a memory containing an encrypted data file from which retrieval must be authorized, comprising means for authorizing said retrieval by providing an encryption key for enabling retrieval of said data and a credit signal for use in limiting the amount of data to be retrieved from said file;

means for limiting the amount of data retrieved from said file in accordance with said credit signal;

means for recording the amount of data retrieved from said file; and means for determining whether credit should be extended in response to a retrieval request prior to providing said encryption key, and, if so, the amount of said credit to be indicated by said credit signal.

17. A system for controlling and accounting for retrieval of data from a memory containing an encrypted data file from which retrieval must be authorized, comprising means for authorizing said retrieval by providing an encryption key for enabling retrieval of said data and a credit signal for use in limiting the amount of data to be retrieved from said file;

means for limiting the amount of data retrieved from said file in accordance with said credit signal; and means for recording the amount of data retrieved from said file; wherein said memory contains encrypted data files for each of a plurality of different data vendors, with a different said encryption key and credit signal being required to retrieve the data file and/or files associated with each of said vendors;

the authorization means comprises means for providing a separate set of encryption key and credit signal for each vendor associated with a said file retrieval authorization;

the limiting means comprises means for limiting retrieval of files associated with different vendors separately in accordance with the encryption key and credit signal provided for said vendor; and the recording means comprises means for separately recording the amount of retrieved data with respect to each vendor.

18. A system according to claim 17 wherein the memory contains a plurality of encrypted data files for a given data vendor; and the recording means comprises means for separately recording the amount of retrieved data with respect to each data file of said given vendor.

19. A system for controlling and accounting for retrieval of data from a memory containing an encrypted data file from which retrieval must be authorized, comprising means for authorizing said retrieval by providing an encryption key for enabling retrieval of said data and a credit signal for use in limiting the amount of data to be retrieved from said file;

means for limiting the amount of data retrieved from said file in accordance with said credit signal; and means for recording the amount of data retrieved from said file;

wherein the memory further contains unencrypted initialization vector data uniquely associated with different blocks of data within the encrypted data file; and the system further comprises means for using said initialization vector data in combination with said encryption key to retrieve data from said file; and means for using said unique initialization vector data upon said retrieval to record the identity of the block of data retrieved from said file.

20. A system for controlling and accounting for retrieval of data from a memory containing an encrypted data file from which retrieval must be authorized, comprising means for authorizing said retrieval by providing an encryption key for enabling retrieval of said data and a credit signal for use in limiting the amount of data to be retrieved from said file;

means for limiting the amount of data retrieved from said file in accordance with said credit signal; and means for recording the amount of data retrieved from said file;

wherein the memory further contains cost data associated with different blocks of data that can be retrieved from said memory; and the system further comprises means for processing the cost data with said credit signal in response to a request to retrieve a given block of data to determine whether retrieval of said requested block of data is authorized; and means for authenticating said cost data prior to said processing of same.

21. A system for controlling and accounting for retrieval of data from a memory containing an encrypted data file from which retrieval must be authorized, comprising means for authorizing said retrieval by providing an encryption key for enabling retrieval of said data and a credit signal for use in limiting the amount of data to be retrieved from said file;

means for limiting the amount of data retrieved from said file in accordance with said credit signal; and means for recording the amount of data retrieved from said file;

wherein the memory is in a customer data retrieval terminal; and the authorization means comprises means for determining in an authorization center located remotely from said customer terminal whether the status of an account associated with said customer terminal warrants authorizing said retrieval, and, if so, providing said encryption key and said credit signal in the customer data retrieval terminal.

22. A system according to claim 21, wherein the memory further contains cost data associated with different blocks of data that can be retrieved from said memory; and the system further comprises means for recording in said customer terminal, the cost data for the blocks of data retrieved in relation to said credit signal provided therein; and means for reporting to the authorization center the record of said cost data in relation to said credit signal.

23. A system according to claim 22, further comprising means for authenticating said report of the record of said cost data in relation to said credit signal.

24. A system for controlling and accounting for retrieval of data from a memory in the customer data retrieval terminal, wherein the memory contains an encrypted data file from which retrieval must be authorized, the system comprising means for authorizing said retrieval in response to a request to retrieve data from said file in said customer data retrieval terminal by determining in an authorization center located remotely from the customer terminal whether the status of an account associated with said customer terminal warrants authorizing said retrieval, and, if so, providing to the customer terminal an encryption key for enabling retrieval of data from said file in the customer data retrieval terminal; and means for recording the retrieval of data from said file by said customer retrieval terminal and debiting said account for said retrieval.

25. A system according to claim 24, wherein the authorizing means comprise means for encrypting said encryption key.

26. A system according to claim 24, wherein the memory is a compact disc ROM.

27. A system for controlling and accounting for retrieval of data from a memory in the customer data retrieval terminal, wherein the memory contains an encrypted data file from which retrieval must be authorized, the system comprising means for authorizing said retrieval in response to a request to retrieve data from said file in said customer data retrieval terminal by determining in an authorization center located remotely from the customer terminal whether the status of an account associated with said customer terminal warrants authorizing said retrieval, and, if so, providing to the customer terminal an encryption key for enabling retrieval of data from said file;

means for recording the retrieval of data from said file by said customer retrieval terminal and debiting said account for said retrieval; and means for verifying decryption of data from said requested file pursuant to use of said encryption key prior to debiting said account.

28. A method of controlling and accounting for retrieval of data from a memory, comprising the steps of
(a) providing a memory containing an encrypted data file from which retrieval must be authorized;
(b) authorizing said retrieval by providing an encryption key for enabling retrieval of said data and a credit signal for use in limiting the amount of data to be retrieved from said file;
(c) limiting the amount of data retrieved from said file in accordance with said credit signal; and
(d) recording the amount of data retrieved from said file.

29. A method according to claim 28, wherein step (b) comprises the step of
(e) encrypting said encryption key.

30. A method according to claim 28, wherein
step (a) comprises providing a memory containing a plurality of encrypted data files for a given data vendor; and
step (d) comprises separately recording the amount of retrieved data with respect to each data file of said given vendor.

31. A method according to claim 28, wherein
step (a) comprises providing a said memory that further contains unencrypted initialization vector data associated with the encrypted data file; and
the method further comprises the step of
(e) using said initialization vector data in combination with said encryption key to retrieve data from said file.

32. A method according to claim 28, wherein
step (a) comprises providing a said memory that further contains unencrypted identification data uniquely associated with different blocks of data within the encrypted data file; and
the method further comprises the step of
(e) using said unique identification data upon said retrieval to record the identity of the block of data retrieved from said file.

33. A method according to claim 28, wherein
step (a) comprises providing a said memory that further contains cost data associated with different blocks of data that can be retrieved from said memory; and
the method further comprises the steps of
(e) processing the cost data with said credit signal in response to a request to retrieve a given said block of data to determine whether retrieval of said requested block of data is authorized.

34. A method of controlling and accounting for retrieval of data from a plurality of identical memories by a corresponding plurality of different data retrieval terminals, comprising the steps of
(a) providing a memory containing an encrypted data file from which retrieval must be authorized;
(b) providing a different unit key in each of the retrieval terminals;
(c) authorizing said retrieval by providing an encryption key encrypted in the unit key of the given retrieval terminal for enabling retrieval of said data in the given retrieval terminal and by providing a credit signal addressed to the given retrieval terminal for use in limiting the amount of data to be retrieved from said file by the given retrieval terminal;
(d) limiting the amount of data retrieved from said file in the given retrieval terminal in accordance with said credit signal; and
(e) recording the amount of data retrieved from said file in said retrieval terminal.

35. A system for controlling and accounting for retrieval of data from a memory containing an encrypted data file from which retrieval must be authorized, comprising
means for authorizing said retrieval by providing an encryption key for enabling retrieval of said data and a credit signal for use in limiting the amount of data to be retrieved from said file;

means for limiting the amount of data retrieved from said file in accordance with said credit signal; and means for recording the amount of data retrieved from said file.

36. A system according to claim 35, wherein the authorization means comprises means for encrypting said encryption key.

37. A system according to claim 35, wherein the memory contains a plurality of encrypted data files for a given data vendor; and the recording means comprises means for separately recording the amount of retrieved data with respect to each data file of said given vendor.

38. A system according to claim 35, wherein the memory further contains unencrypted initialization vector data associated with the encrypted data file; and the system further comprises means for using said initialization vector data in combination with said encryption key to retrieve data from said file.

39. A system according to claim 35, wherein the memory further contains unencrypted identification data uniquely associated with different blocks of data within the encrypted data file; and the system further comprises means for using said unique identification data upon said retrieval to record the identity of the block of data retrieved from said file.

40. A system according to claim 35, wherein the memory further contains cost data associated with different blocks of data that can be retrieved from said memory; and the system further comprises means for processing the cost data with said credit signal in response to a request to retrieve a given said block of data to determine whether retrieval of said requested block of data is authorized.

41. A system according to claim 35, wherein the memory is a compact disc ROM.

42. A system for controlling and accounting for retrieval of data from a plurality of identical memories by a corresponding plurality of different data retrieval terminals, wherein each memory contains an encrypted data file from which retrieval must be authorized, the system comprising means providing a different unit key in key in each of the retrieval terminals;

means for authorizing said retrieval by providing an encryption key encryption in the unit key of the given retrieval terminal for enabling retrieval of said data in the given retrieval terminal and by providing a credit signal addressed to the given retrieval terminal for use in limiting the amount of data to be retrieved from said file by the given retrieval terminal;

means for limiting the amount of data retrieved from said file in the given retrieval terminal in accordance with said credit signal; and means for recording the amount of data retrieved from said file in said retrieval terminal.

43. A system according to claim 42, wherein the memory is a compact disc ROM.

* * * * *